(12) United States Patent
Sawada et al.

(10) Patent No.: US 6,583,561 B2
(45) Date of Patent: Jun. 24, 2003

(54) MATERIAL FOR CONVERTING ULTRAVIOLET RAY AND DISPLAY DEVICE USING THE SAME

(75) Inventors: Takao Sawada, Tokyo (JP); Keiji Fukuyama, Tokyo (JP); Noritsuna Hashimoto, Tokyo (JP); Ko Sano, Tokyo (JP); Manabu Akiba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 176 days.

(21) Appl. No.: 09/782,022

(22) Filed: Feb. 14, 2001

(65) Prior Publication Data
US 2001/0050528 A1 Dec. 13, 2001

(30) Foreign Application Priority Data
Feb. 22, 2000 (JP) .................................. 2000-044414

(51) Int. Cl.[7] ................................................. H01J 17/49
(52) U.S. Cl. ..................... 313/587; 313/586; 313/582; 313/583
(58) Field of Search .............................. 313/582, 583, 313/586, 587

(56) References Cited

U.S. PATENT DOCUMENTS

| | | | | |
|---|---|---|---|---|
| 6,075,319 A | * | 6/2000 | Kanda et al. ............... | 313/584 |
| 6,137,217 A | * | 10/2000 | Pappalardo et al. ........ | 313/487 |
| 6,153,824 A | * | 11/2000 | Takada et al. ............... | 136/263 |
| 6,440,823 B1 | * | 8/2002 | Vaudo et al. ............... | 438/478 |

FOREIGN PATENT DOCUMENTS

| | | |
|---|---|---|
| JP | 52-20762 | 2/1977 |
| JP | 2000-133148 | 5/2000 |

* cited by examiner

Primary Examiner—Sandra O'Shea
Assistant Examiner—Anabel Ton
(74) Attorney, Agent, or Firm—Oblon, Spivak, McClelland, Maier & Neustadt, P.C.

(57) ABSTRACT

The object of the present invention is to provide a gas discharge display device having improved luminous efficiency by effectively using ultraviolet ray, which is absorbed in a partition wall or a protective film and the like without contributing to excitation of a fluorescent material. By adding gadolinium to the materials excluding the fluorescent material among structures surrounding the discharge cell, ultraviolet ray having a wavelength of 315 nm is generated, which can excite the fluorescent material. The ultraviolet ray excites the fluorescent material to generate visible light, and then, electric-light conversion efficiency is improved.

12 Claims, 7 Drawing Sheets

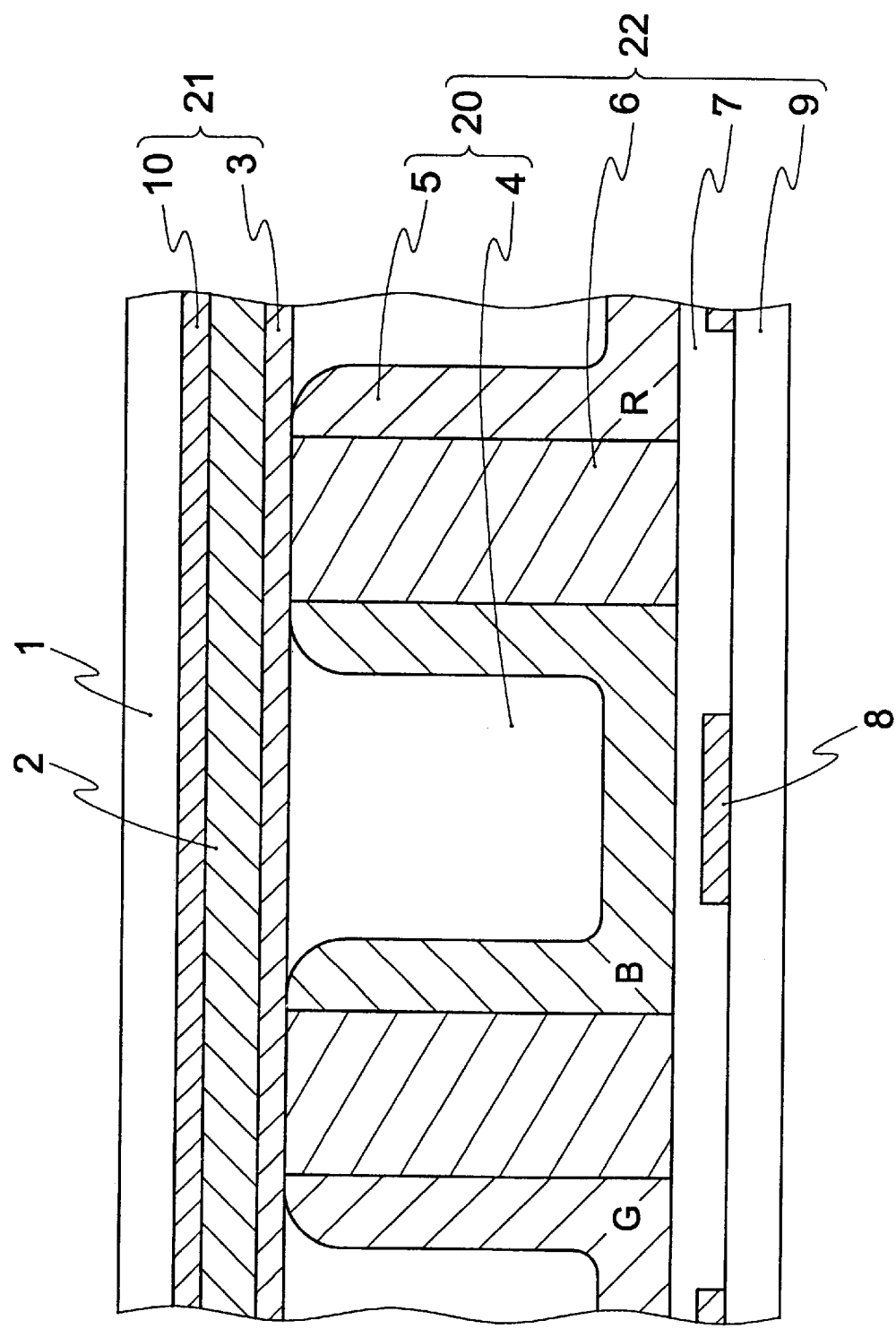

MATERIAL FOR CONVERTING ULTRAVIOLET RAY AND DISPLAY DEVICE USING THE SAME

BACKGROUND OF THE INVENTION

The present invention relates to a display unit displaying desired images by exciting a fluorescent material, and particularly, to a material for improving luminous efficiency and a display unit using the same, which is used, for example, for a gas discharge display unit such as a plasma display panel (hereinafter referred to as PDP).

In a conventional and typical PDP, a gas containing xenon is sealed in space sandwiched between a front substrate and a back substrate. Electric discharge is induced by applying voltage to excite a gas containing xenon, a fluorescent material is excited by emission at a wavelength of 147 nm and by broad emission at a peak wavelength of 170 nm, and desired visible light is generated to display images.

FIG. 7 shows a sectional structure of an AC type plasma display panel, which is an example of the conventional gas discharge display unit. In the figure, numeral 1 is a front glass substrate, numeral 2 is a dielectric material layer, numeral 3 is a protective film, numeral 4 is a discharge gas, numeral 5 is a fluorescent layer, numeral 6 is a partition wall, numeral 7 is a lower layer, numeral 8 is an address electrode, numeral 9 is a back glass substrate, numeral 10 is a sustain discharge electrode, numeral 20 is a dischage cell, numeral 21 is a front panel, and numeral 22 is a back panel.

In the conventional PDP, by applying external voltage to the address electrode 8 and the sustain discharge electrode 10, electric discharge occurs in the discharge cell 20 to excite a discharge gas 4. And at the time when the excited discharge gas 4 is transited to stabilized state, ultraviolet ray is generated (in case of using a xenon gas, it is ray of a wavelength of 147 nm and broad ray at the peak wavelength of 170 nm). By the ultraviolet ray, the fluorescent material layer 5 in the discharge cell 20 is excited to generate visible light necessary for display. And, by using the visible light, desired images are formed and displayed.

However, in these conventional PDP, an energy conversion efficiency (display light/input power) is as low as 0.4%, power consumption is larger than that of CRT or a liquid crystal display unit. And heat is generated as shown, for example, in NIKKEI Electronics, Oct. 25, 1999 (No. 755) p99. Therefore, it has become an important subject to improve the energy conversion efficiency (or luminous efficiency).

In addition, in case of color display of the conventional PDP, balance of luminous intensities of the three kinds of fluorescent materials emitting red, green and blue is important. And it determines a white color temperature at simultaneous emission of the three colors. In the conventional PDP, luminous efficiency of a blue color fluorescent material is poor, and there has been a problem that the white color temperature is low.

With respect to the above problems, at first, as one of the methods for improving the energy conversion efficiency, there is given an effective utilization of ultraviolet ray. In the conventional PDP, the ultraviolet ray irradiated from the discharge gas present in the space of the discharge cell is radiated toward all directions. However, most of the ultraviolet ray directed to the constituting materials surrounding the discharge space excluding the fluorescent material is not utilized for exciting the fluorescent material and it becomes lost. Therefore, it is intended to effectively utilize the ultraviolet ray to improve energy conversion efficiency.

In this respect, there has been a proposal to improve luminous efficiency by utilizing the ultraviolet ray absorbed in the protective film of the dielectric. For example, there is disclosed, as shown in Japanese Unexamined Patent Publication No. 20762/1977, a method for effectively utilizing ultraviolet ray by providing the protective film with fluorescence by containing 1% by weight of CeO in MgO. Also, there is disclosed a method that a fluorescent protective film material $(SrMg)_2P_2O_7:Eu_2^+$, which is obtained by mixing the film material with an activator to give fluorescence, absorbs ultraviolet ray generated by gas discharge and discharges ultraviolet ray having a wavelength of 2000 to 3000 Å. However, the wavelength of the ultraviolet ray irradiated according to these methods is at most 300 nm (3000 Å), and thus it was difficult to improve the color temperature as described above.

Also, as a method for improving the color temperature in the conventional PDP, there is, for example, a method for increasing a luminous amount of blue color against the luminous amount of red and green by changing discharging cell width of the three colors to improve the color temperature as disclosed in Japanese Unexamined Patent Publication No. 308179/1998. However, according to this method, since the energy conversion efficiency is not improved and structural conditions of each cell are different, the discharge conditions are different in each cell, and there is a defect that margin of discharge becomes narrow.

In order to solve the above problems, the present inventors performed various experiments. As a result, it was found that by adding a small amount of gadolinium (hereinafter referred to as Gd) among various rare earth elements into a protective film material or the like as a PDP constituted material, the protective film or the like functions as a material for converting ultraviolet ray which generates ultraviolet ray having a longer wavelength on receipt of ultraviolet ray from the discharge gas. And the film improves the luminous efficiency of the display unit such as a plasma display panel, and additionally improves the color temperature of white color display. The present invention is based on these findings.

Japanese Unexamined Patent Publication No. 220640/1995 discloses that the protective film of the alternating current discharge unit contains a compound containing gadolinium. The object of the above method is to obtain a finer magnesium oxide film formed by a printing method to improve sputtering resistance according to discharge, by simultaneously forming a spinal structured $Ba_{0.6}Sr_{0.4}Gd_2O_4$ compound containing magnesium oxide and gadolinium according to a printing method. Accordingly, the gadolinium compound is used as a material having adhesive function, and the gadolinium is used only for a partial substituting material of the magnesium oxide film. Furthermore, in the disclosed gadolinium compound, the portion in which gadolinium is locally present has a large gadolinium concentration of about 60% by mole. And there is no generation of long wavelength ultraviolet ray due to concentration quenching (it is thought as a phenomenon caused by absorption of excited energy due to resonance transmission among activator ions when a concentration of the luminous activator added to an oxide is high).

Additionally, it is disclosed, for example, in p120, "Fluorescent Material Handbook" edited by Fluorescent Material Scientist Academy (published by Ohm Co.) that Gd shows extensive emission at about 315 nm. But there has not been known at all that Gd is used for ultraviolet ray conversion under environment of discharging and exciting fluorescent material.

SUMMARY OF THE INVENTION

The present invention has been conducted to solve the problems with the above conventional devices. The object of the present invention is to provide a material for converting ultraviolet ray, which can improve luminous efficiency of a gas discharge display device by utilizing ultraviolet ray otherwise absorbed in a barrier rib, a protective film and the like, and a display device using the same.

The first material for converting ultraviolet ray of the present invention comprises a small amount of gadolinium in a base substrate, wherein ultraviolet ray having the longer wavelength than the irradiated ultraviolet ray is generated by the ultraviolet irradiation.

The second material for converting ultraviolet ray of the present invention is that in the first material, the base substrate comprises an insulating material.

The third material for converting ultraviolet ray of the present invention is that in the first or second material, an amount of the gadolinium is at least 0.1 to at most 20% by mole.

The fourth material for converting ultraviolet ray of the present invention is that in any of the first to third materials, the ultraviolet ray irradiated to the base substrate has a wavelength of at least 200 nm.

The first display device of the present invention comprises a fluorescent material, an exciting means for exciting the fluorescent material and a means for converting ultraviolet ray around the fluorescent material, wherein the means for converting ultraviolet ray contains a small amount of gadolinium in a base substrate and generates, by ultraviolet ray irradiation, ultraviolet ray having a longer wavelength than the irradiated ultraviolet ray.

The second display device of the present invention is that in the first display device, the fluorescent material comprises a plurality of fluorescent materials emitting red light, green light and blue light, wherein the long wavelength ultraviolet ray is irradiated at least to the fluorescent material emitting blue light.

The third display device of the present invention is that in any of the first and second display device, an amount of the gadolinium is at least 0.1 to at most 20% by mole.

The fourth display device of the present invention is that in any of the first to third display device, a wavelength of the ultraviolet ray irradiated to the base substrate is at most 200 nm.

The fifth display device of the present invention comprises a first substrate having a dielectric and a protective film for protecting the dielectric; a second substrate having a partition wall and a fluorescent material layer and opposing to the first substrate; a rare gas filling space held between the first substrate and the second substrate; and an exciting means for exciting the fluorescent material layer by discharge of the rare gas and controlling lighting of a plurality of pixels, wherein at least one of the dielectric, the protective film and the partition wall contains a small amount of gadolinium.

The sixth display device of the present invention is that in the fifth display device, the protective film comprises MgO containing a small amount of gadolinium.

The seventh display device of the present invention is that in the fifth or the sixth display device, the fluorescent material layer comprises a plurality of fluorescent material layers, which are parted by the partition wall and emit red, green and blue light.

The eighth display device of the present invention is that in any of fifth to seventh display device, the first ultraviolet ray is generated by discharge of the rare gas to excite the gadolinium, leading to the generation of the second ultraviolet ray having a longer wavelength than that of the first ultraviolet ray.

The ninth display device of the present invention is that in the eighth display device, a white color temperature is controlled due to increase of luminous intensity of the fluorescent material layer emitting blue light by the second ultraviolet ray.

The tenth display device of the present invention is that in any of the fifth to ninth device, an amount of the gadolinium is at least 0.1 to at most 20% by mole.

The eleventh display device of the present invention is that in any of the eighth to tenth display device, a wavelength of the first ultraviolet ray is at most 200 nm.

The twelfth display device of the present invention is that in any of the eighth to eleventh display device, the fluorescent material layer has two-layered structure of the first fluorescent material layer and the second fluorescent material layer, wherein the white color temperature is controlled by setting the first ultraviolet ray and the second ultraviolet ray to the pre-determined values and by adjusting luminous intensities of the first and second fluorescent material layers.

The thirteenth display device of the present invention is that in twelfth display device, the first fluorescent material layer is formed on the second fluorescent material layer.

The fourteenth display device of the present invention is that in any of the twelfth and thirteenth display device, the first fluorescent material layer is thinner than the second fluorescent material layer.

The fifteenth display device of the present invention is that in sixth display device, an amount of the gadolinium is at least 0.1 to at most 20% by mole.

BRIEF DESCRIPTION OF THE DRAWINGS

And FIG. 7 is a sectional view showing construction of a conventional AC type PDP discharge cell.

DETAILED DESCRIPTION

Figure 1:
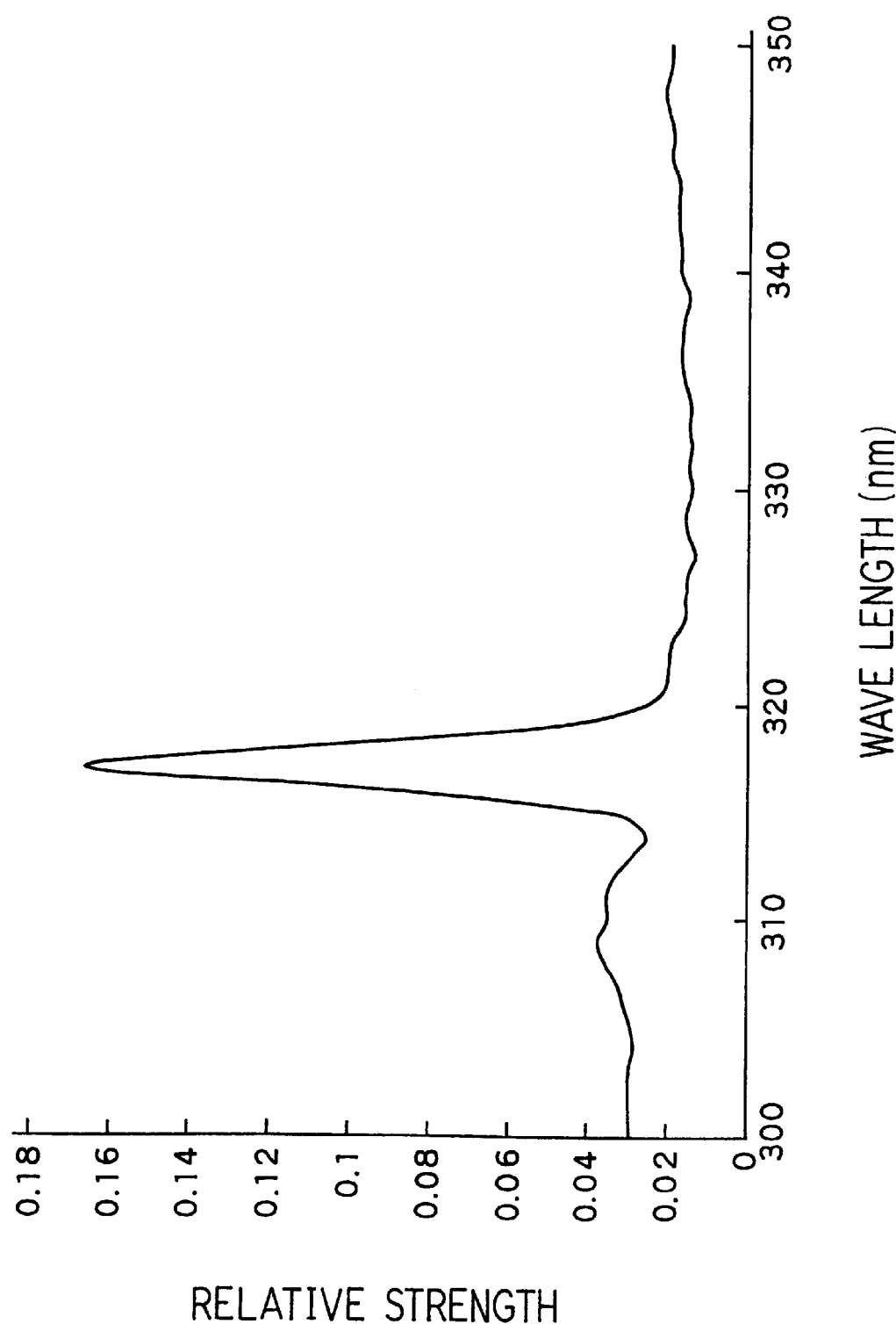
FIG. 1 is a luminous spectrum diagram of ultraviolet ray having a wavelength of 315 nm obtained by exciting a protective film containing 7% by mole of gadolinium oxide in MgO by using a vacuum ultraviolet ray lamp containing ray having a wavelength of 147 nm according to the present invention.

The material for converting ultraviolet ray of the present invention comprises a small amount of Gd contained in the base substrate, and it is constructed to generate ultraviolet ray having a longer wavelength than the irradiated original ultraviolet ray by irradiating ultraviolet ray.

Herein, as the main substrate, there can be used various materials which can stably maintain Gd, and Gd may be contained in the form of a compound such as oxide. Examples of the base substrate are not limited to an insulating material and a dielectric material, there can be used light transmitting electric conductive materials and the like (ITO or $SnO_2$, for example), though it depends on its use.

Furthermore, in PDP, which is an example of an image display unit containing a fluorescent material, the base substrate means a constituting material such as a dielectric, a protective film and a partition wall (also referred to as rib or barrier rib).

An amount of Gd in the main substrate is a small amount. Usually, it is preferably 0.1 to 20% by mole, more preferably 4 to 9% by mole. When it exceeds this range, luminous efficiency is lowered, and it is not desirable since improvement effect is decreased.

The display unit of the present invention comprises a fluorescent material, an exciting means for exciting the fluorescent material, and a ultraviolet ray converting means which is provided around the fluorescent material and contains a small amount of gadolinium in the base substrate and generates, by ultraviolet ray irradiation, ultraviolet ray having a longer wavelength than the irradiated ultraviolet ray.

Herein, an example of the exciting means is, in case of the gas discharge display unit, construction which can discharge gas and generate ultraviolet ray to irradiate the ultraviolet ray on the fluorescent material. However, the exciting means are not limited thereto.

The display unit of the present invention shows its effects under irradiation of ultraviolet ray having a wavelength of at most 200 nm. A long wavelength ultraviolet ray can be generated due to a small amount of Gd contained in the base substrate.

The term "around" means that at least the long wavelength ultraviolet ray generated from the ultraviolet ray conversion means is disposed as closely as it can reach the fluorescent material. For example, in case of PDP which is one of the gas discharge display units, by containing Gd in the dielectric, the protective film and in the partition wall, the ultraviolet ray conversion means may be disposed as these constitution materials. Particularly, by applying it to PDP among the display units, an excellent display unit can be constituted.

Thus, the present invention provides a display unit comprising a first substrate having a dielectric and a protective film for protecting the dielectric; a second substrate having a partition wall and a fluorescent material layer opposing to the first substrate; a rare gas filling space held between the first substrate and the second substrate; and an exciting means for exciting the fluorescent material layer by discharge of the rare gas and controlling lighting of a plurality of pixels, wherein at least one of the dielectric, protective film and partition wall contains a small amount of gadolinium.

The above dielectric can be obtained, for example, by applying a paste material to a substrate according to screen-printing or a roll coater, and baking. Examples of the paste materials are glass paste for dielectric OC-500L, OC-555 and G3-0350 available from Okuno Seiyaku Kogyo, a glass paste for transparent dielectric PLS-3162S and PLS-3232 available from Nippon Electric Glass Co., Ltd., glass paste for dielectric NP-7858, NP-7972 and NP-7976 available from Noritake Kizai and the like. By mixing a predetermined amount of gadolinium with these paste materials and baking under a condition of about 450° to 550° C., a desired dielectric can be formed.

Alternatively, the dielectric can be formed by applying a film dielectric to a substrate.

The above protective film may be, for example, MgO. The film can be formed by a method of directly applying, onto the dielectric, the single crystalline or sintered material or a compound thereof containing a predetermined amount of gadolinium according to electron beam vacuum deposition, sputtering vacuum deposition or the like. The film can also be formed by a method in which the material containing a predetermined amount of gadolinium is mixed with a solvent to prepare a paste and the paste is applied to the substrate by screen-printing and the paste is baked.

The Gd amount is desirably 0.1 to 10% by mole from the viewpoint of sputter resistance of MgO.

The partition wall may be formed, for example, by a method of directly pattern-forming a paste material according to screen-printing, or by a method of pattern-forming by using a sandblast or a die after forming the material by screen-printing or with a roll coater. Also, there can be used a method of photolithography by using photosensitive materials. Examples of the host materials for the screen printing or the roll coating of the partition wall are glass paste for barrier rib ELD-513, ELD-514, ELD-520, ELD-501A, ELD-507B, ELD-655, ELD-650, ELD-835, G3-0414, G3-0414W, ELD-839-10, ELD-630 and ELD-667 available from Okuno Seiyaku Kogyo, glass paste for barrier rib PLS-3550 and PLS-3551 available from Nippon Electric Glass Co., Ltd., and glass paste for barrier rib NP-7853 and NP-7854 available from Noritake Kizai Co., Ltd. A desirable partition wall can be prepared by mixing a predetermined amount of gadolinium with these paste materials and baked at about 450° to 600° C.

Examples of the host materials for sandblast are sandblast tape for barrier rib NEW S/B TOS available from DuPont and NP-7863 and NP-7864 available from Noritake Kizai Co. Ltd. and the like. A desired partition wall can be formed by mixing a predetermined amount of gadolinium with these tape materials or paste materials, by sandblast processing after pattern-forming according to photolithography, and baking at 450° to 600° C.

As the above rare gas, there is used He, Ne, Ar, Kr or Xe in a simple substance or a mixed gas thereof. Typical compositions are Ne—Xe (2 to 5% by weight), He—Xe (2 to 10% by weight) and the like.

In such PDP, the ultraviolet ray generated by gas discharge is absorbed not only in the fluorescent material but also much in the above protective film, the dielectric and the partition wall, and usually there is some loss. In the display unit of the present invention, at least one of the protective film, the dielectric or the partition wall contains a small amount of Gd, and has a function of ultraviolet ray conversion for converting the ultraviolet ray generated by gas discharge into ultraviolet ray having the longer wavelength. Accordingly, the converted long wave ultraviolet ray is utilized for excitation of the fluorescent material, and as a result, there becomes no loss.

Particularly, when MgO as a protective film contains a small amount of Gd, the effect is large, and it is desirable.

Alternatively, the display unit of the present invention can be constituted in such a way that the fluorescent material layer comprises a plurality of fluorescent material layers emitting red, green and blue light, and that the long wavelength ultraviolet ray is irradiated at least to the fluorescent material layer emitting blue light.

Furthermore, the display unit of the present invention can be constituted in such a way that it comprises a first fluorescent material layer excited by the first ultraviolet ray and a second fluorescent material layer excited by the second ultraviolet ray. In this case, intensities of the first ultraviolet ray and the second ultraviolet ray are set to the desired values, and a white color temperature is controlled by adjusting the luminous intensities of the first and second fluorescent material layers.

In the display unit of the present invention, it is also possible to form the first fluorescent material layer on the second fluorescent material layer.

In order to effectively extract the visible light radiated from the second fluorescent material layer positioned at a lower layer, the first fluorescent material layer positioned at an upper layer is required to be a thin layer. The second fluorescent material layer positioned at the lower layer functions as a reflecting layer against the visible light radiated from the first fluorescent material layer positioned at the upper layer, and the second layer is required to have a certain thickness. Accordingly, if the thickness of the first fluorescent material layer is thinner than that of the second fluorescent material layer, it is more preferable since the visible light radiated from these fluorescent material layers is efficiently extracted.

Hereinafter, the embodiments of the present invention are described with reference to the accompanying drawings.

Embodiment 1

FIG. 1 illustrates one embodiment of the present invention. Namely, it is a luminous spectrum diagram obtained by irradiating ultraviolet ray of 147 nm on a MgO film prepared by effecting electron beam vapor deposition in an oxygen atmosphere to oxide pellets containing 7% by mole of gadolinium oxide in magnesium oxide (hereinafter, MgO). There can be recognized a clear luminous spectrum of ultraviolet ray centering on 315 nm.

Embodiment 2

Figure 2:
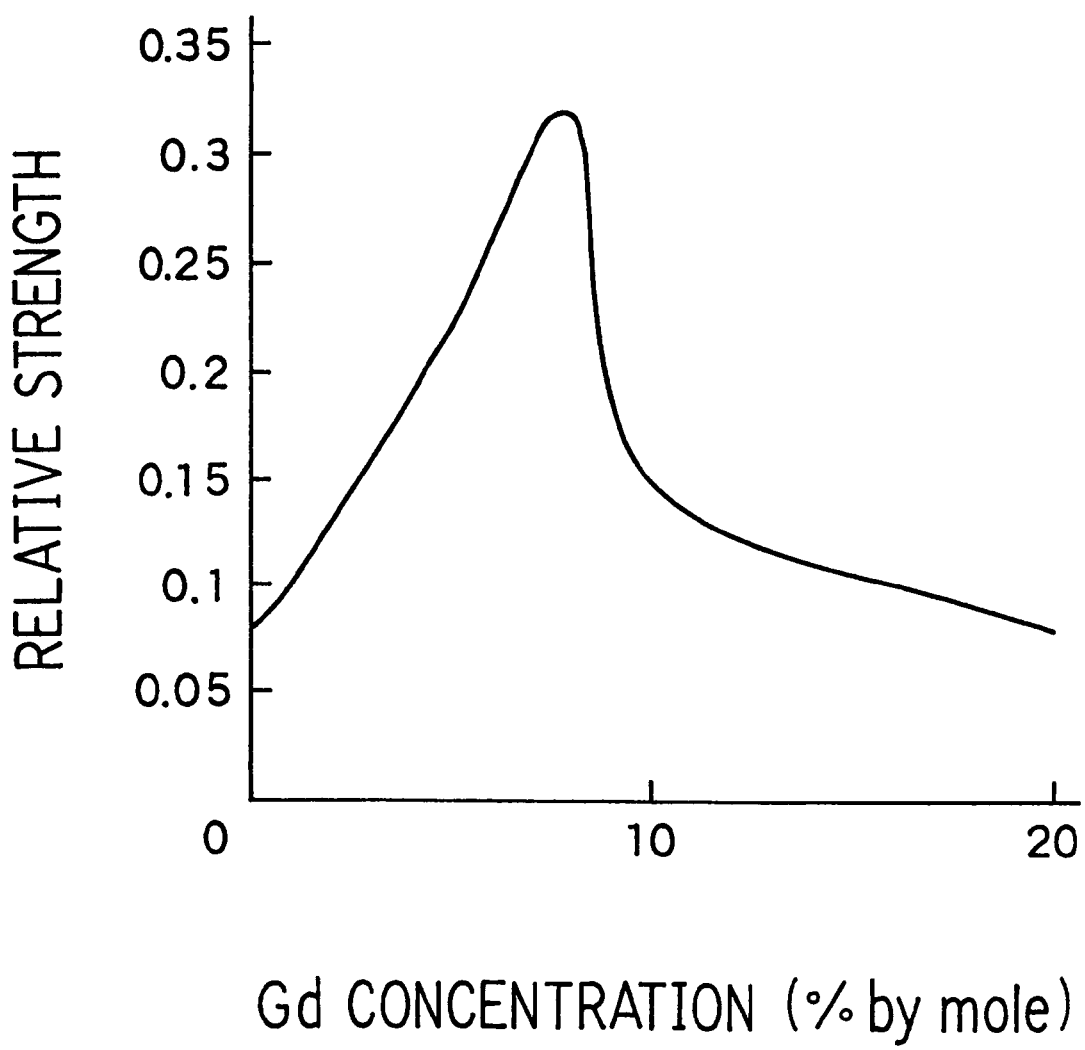
FIG. 2 illustrates the relative luminous intensity of 315 nm to the Gd amount varying the Gd amount of the material for the gas discharge display unit of the present invention.

FIG. 2 shows change of luminous intensity of ultraviolet ray centering on 315 nm in case of changing the Gd amount in the MgO film in accordance with the method shown in Embodiment 1. The vertical axis shows a relative intensity based on the peak value. It can be observed from the figure that when Gd of about 0.1 to 20% by mole is contained in the MgO film, luminous intensity is increased. It can be seen that, particularly in case of containing 4 to about 9% by mole of Gd, the relative luminous intensity is more than 80% of the peak value.

In the figure, luminous intensity is low at a small Gd amount because an amount of the excited Gd is small. Also, the relative luminous intensity is lowered when Gd amount is more than about 20% by mole due to the above-mentioned concentration quenching.

Embodiment 3

Figure 3:
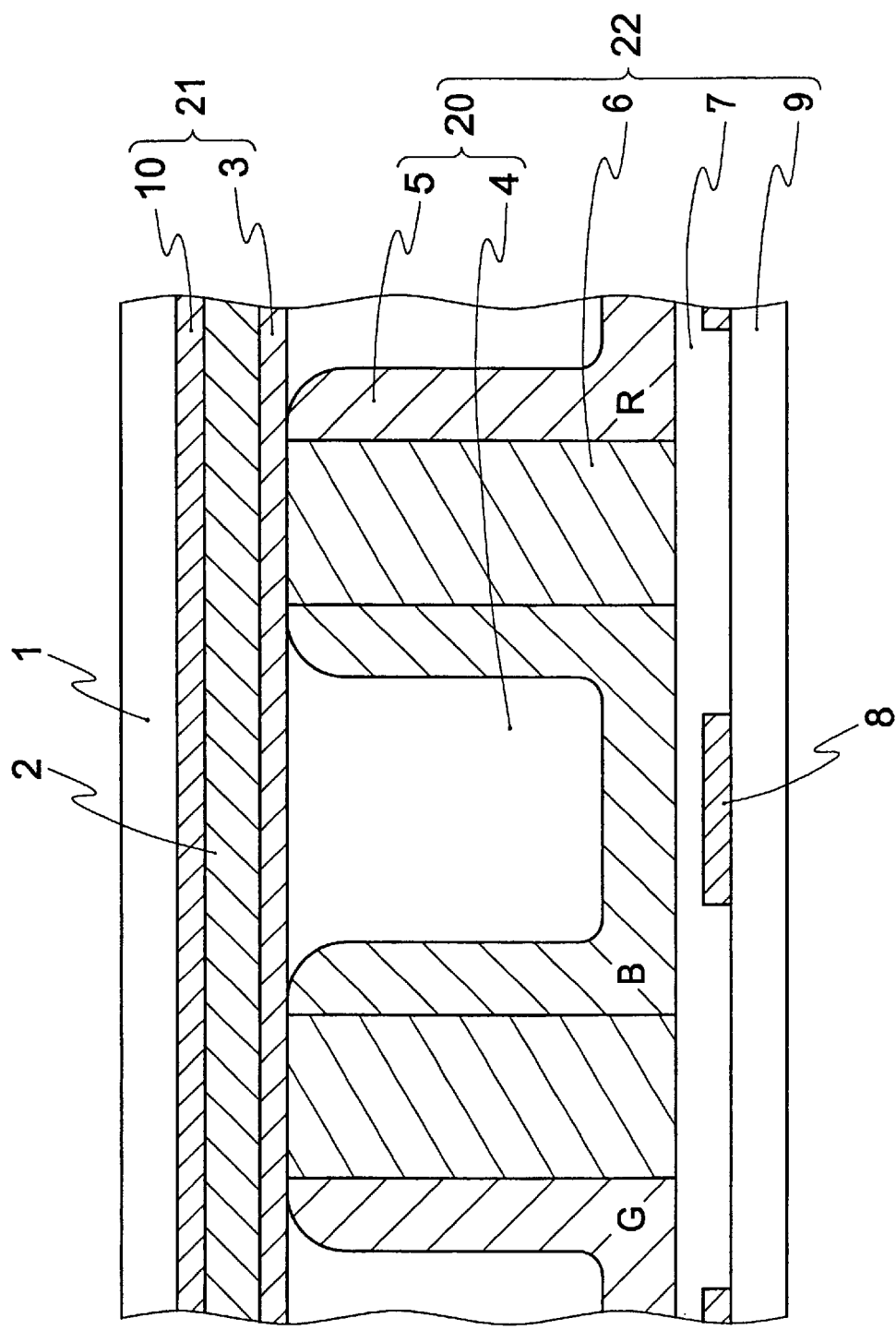
FIG. 3 is a vertical sectional view showing the construction of the discharge cell of AC type PDP, which is an example of the gas discharge display unit of the present invention.

FIG. 3 is a sectional structural view of a plasma display panel, which is an example of the present invention. Though its basic structure is the same as the sectional structure of the conventional PDP shown in FIG. 7, the PDP of the present invention contains at least 0.1 to at most 20% by mole of gadolinium (hereinafter referred to as Gd) in the dielectric layer 2, the protective film 3 and the partition wall 6.

Next, operation of the PDP of the present invention is explained.

When voltage is induced to an address electrode 8 and a sustain discharge electrode 10 from an outside source, discharge occurs at the discharge cell 20, and ultraviolet ray depending on the gas kind is generated by excitation and transition of the discharged gas 4. This ultraviolet ray excites the fluorescent material layer 5, and the fluorescent material layer 5 comprises three kinds of fluorescent material layers; a red color fluorescent material layer R emitting red color, a green color fluorescent material layer G emitting green color, and a blue color fluorescent material layer B emitting blue color. Each of the excited fluorescent material layers 5 emits the visible light of the predetermined luminous color, respectively. In addition, the ultraviolet ray absorbed in the protective film 3, the dielectric layer 2 and the partition wall 6, which are the materials other than the fluorescent materials placed around the discharge cell 20, excites Gd contained in these materials. At the time of transition of the excited Gd to a stabilized state, ultraviolet ray of 315 nm is radiated. This ultraviolet ray of 315 nm excites the fluorescent material 5 to emit the visible light.

Figure 4:
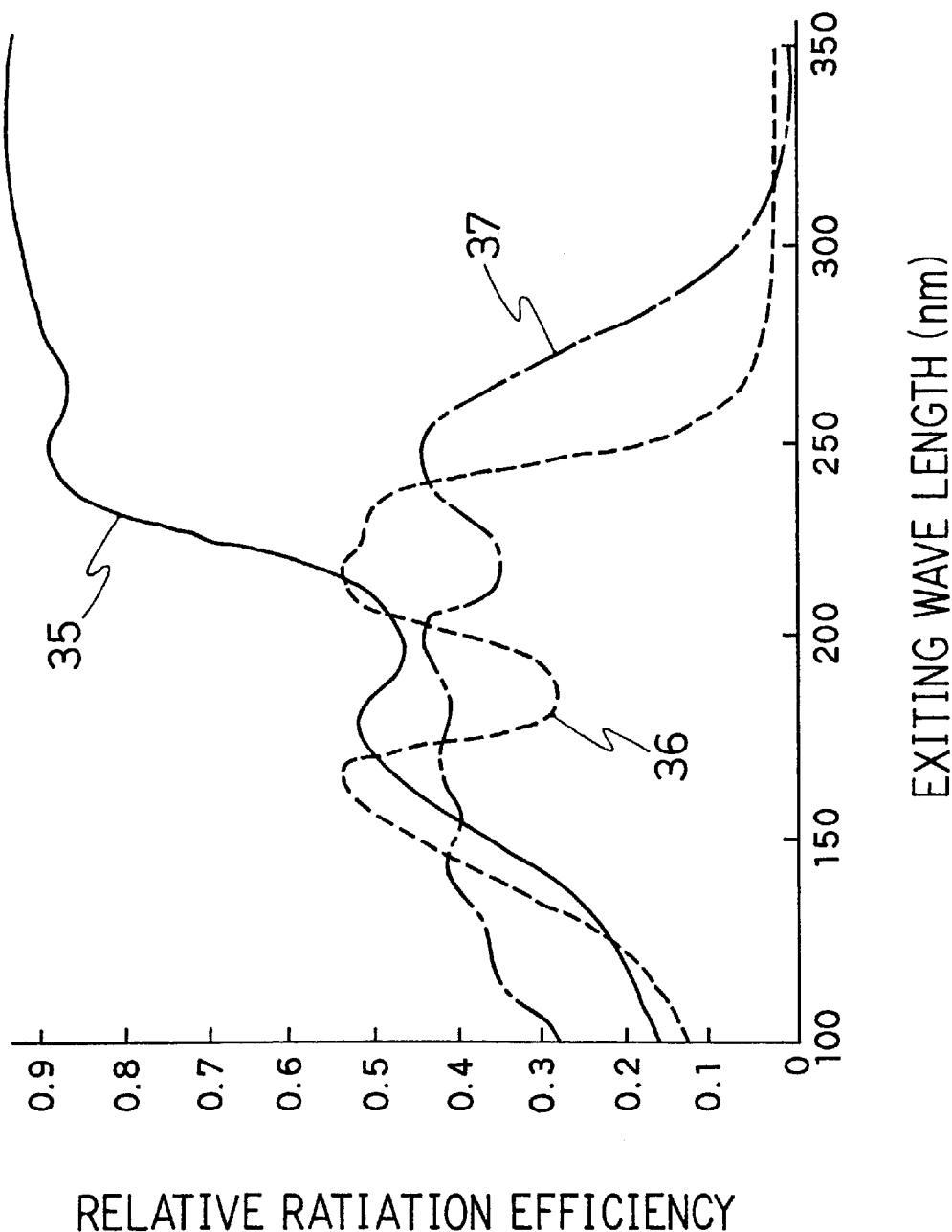
FIG. 4 illustrates exciting spectrum of the three basic color fluorescent materials in the gas discharge display unit of the present invention. In the figure, numeral 35 shows Blue: $BaMg_2Al_{16}O_{27}$: $Eu^{2+}$, $Mn^{2+}$, numeral 36 shows Red: $3.5MgO.0.5MgF_2.GeO_2$: $Mn^{4+}$, and numeral 37 shows Green: $Y_2SiO_5$: $Ce^{3+}$, $Tb^{3+}$.
Figure 5:
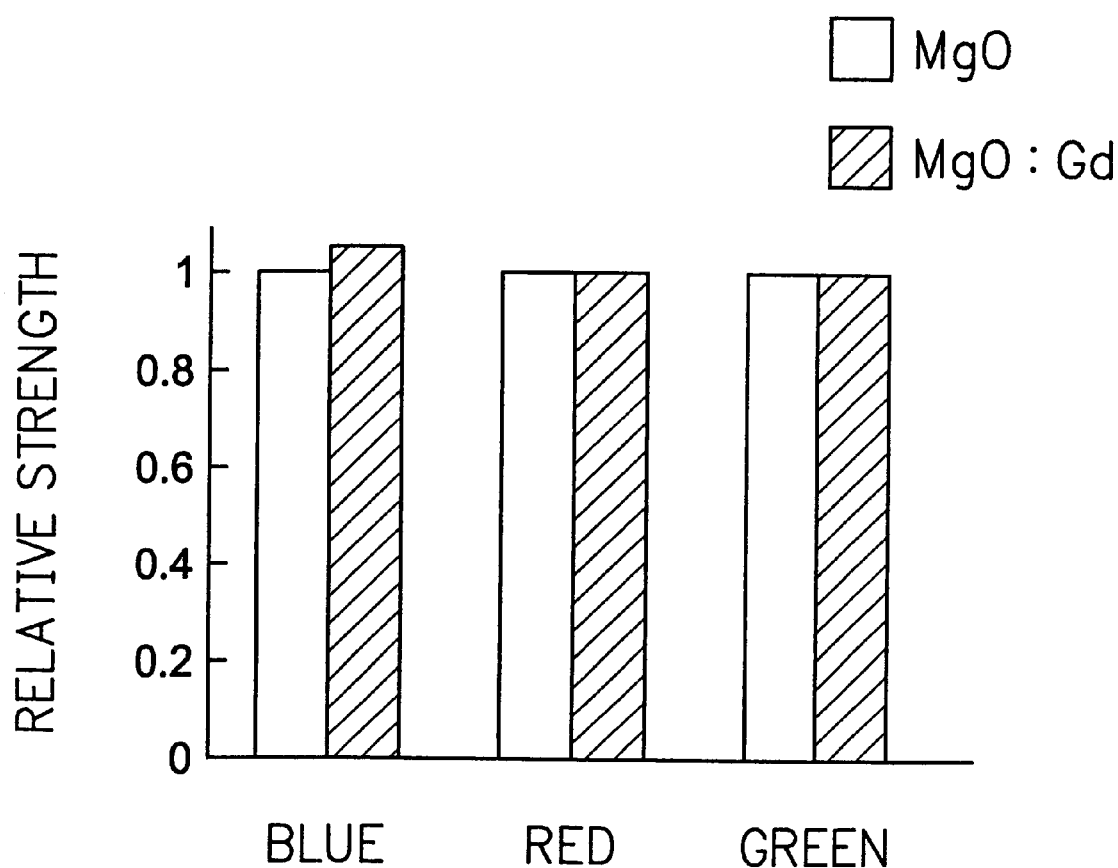
FIG. 5 is a graph comparing the relative luminous intensities of the three basic color emission of the gas discharge display unit of the present invention with that of the conventional gas discharge display unit.

FIG. 4 shows an excitation spectrum of the fluorescent material used in Embodiment 3 of the present invention. FIG. 5 shows brightness comparison between the PDP in the embodiment of the present invention and the conventional PDP having a protective film containing no Gd in case of single color display of blue, red and green, respectively.

In FIG. 5, the relative brightness shows about 7% increase only in blue color, with scarce increase in red and green colors. This is because, as shown in FIG. 4, only the blue fluorescent material shows strong excitation to the ultraviolet ray having a wavelength of 315 nm obtained by Gd addition.

Furthermore, due to the increase only in the relative luminous brightness of the blue color fluorescent material layer, the color temperature of the white color was increased by 700° C., and improvement effect was observed in the color temperature.

Embodiment 4

Next, there is described a process for preparing a protective film to which Gd is added as an activator. Basic magnesium carbonate as an MgO initial material and a predetermined amount of gadolinium oxide are mixed in a mortar and pressed to obtain a pressed powder having a size of 5 to 7 mm square. Basic magnesium carbonate is added to be easily sintered after pressing. In ordinary industrial processes, a binder is added to an oxide and granulated, pressed and baked. Further, in order to prepare a complete oxide, baking is carried out at a temperature of at least 1600° C. By vacuum vapor deposition using the obtained oxide pellet as a vapor deposition source, a pre-determined protective film is obtained.

Herein, an oxide pellet was used as a vapor deposition source, but depending on the vapor deposition apparatus, not a pellet but a bar-like sintered material may be used. Alternatively, it is also possible to form an MgO film with a metal having the same amount as vacuum deposition or reactive sputtering in an oxygen atmosphere.

Furthermore, as a vacuum deposition material of MgO for PDP, there are ordinarily used MgO single crystal particles obtained by electromelting. If a pre-determined amount of Gd is contained, these single crystals can be used as the materials used in the present invention.

Embodiment 5

Figure 6:
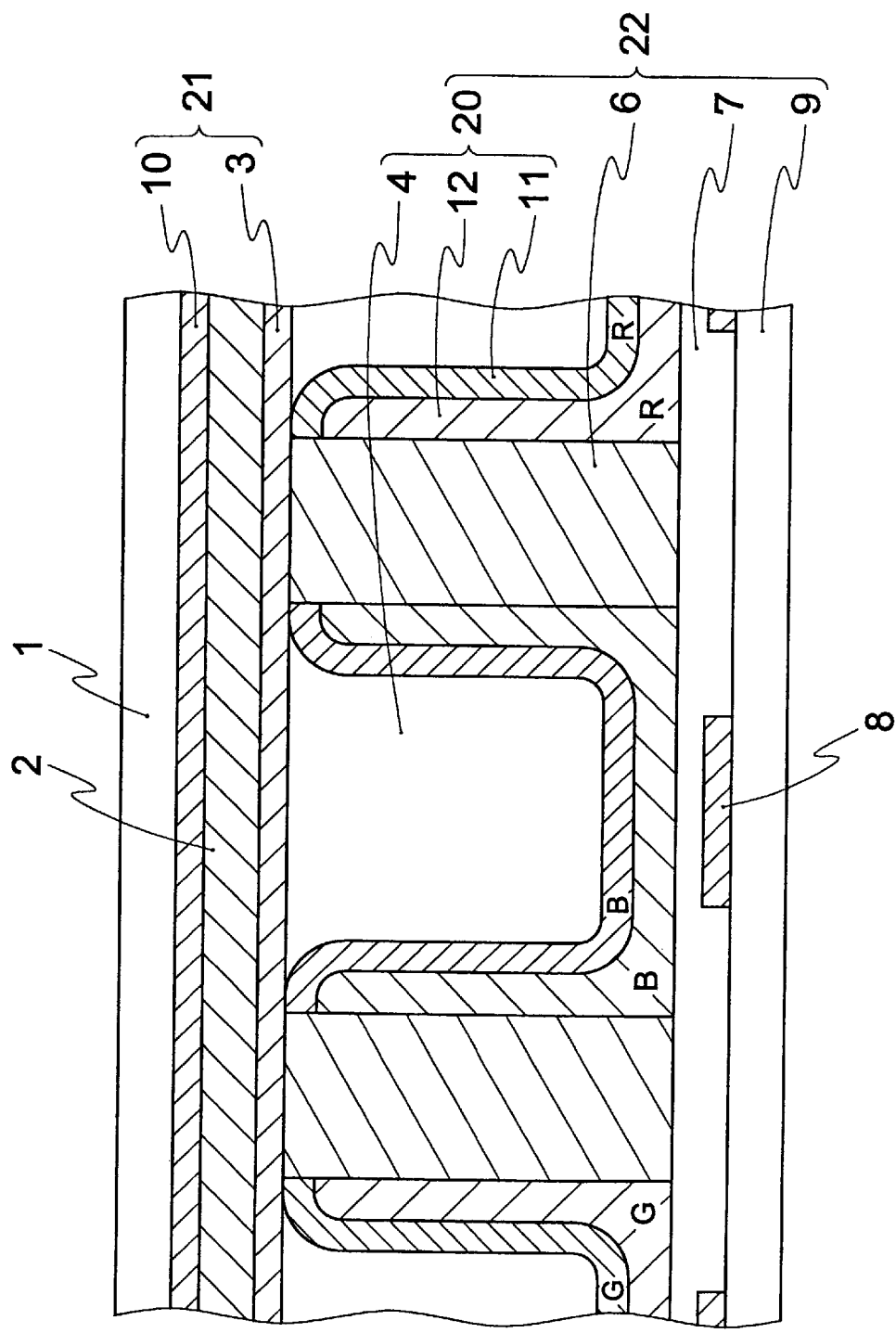
FIG. 6 is a view showing construction of a two-layered fluorescent material film of the present invention.

FIG. 6 is a view showing a cell structure according to Embodiment 5 of the present invention, in which the fluorescent material layer has a two-layered structure of an upper layer and a lower layer. In the figure, numeral 11 shows an upper fluorescent material layer and numeral 12 a lower fluorescent material layer. The upper fluorescent material layer 11 is a fluorescent material layer, which is excited to emit light by the ultraviolet ray radiated by gas discharge, and the lower fluorescent material layer 12 is a fluorescent material layer which is excited by the ultraviolet ray of 315 nm. The ultraviolet ray of at most 200 nm which is radiated from xenon by the discharge of the dischage cell excites the upper fluorescent layer 11. But due to the low reflective ratio on the surface of the fluorescent material particles, the light is scattered and only extremely small amount thereof reaches the lower layer. Thickness through which the light can reach is presumed to be at most 10 to 15 µm. On the other hand, a long wavelength ultraviolet ray of 315 nm radiated from the MgO film is well reflected on the fluorescent material particle surface, and, passes through the gap between the particles in the upper fluorescent material layer, and reaches the lower layer. And then it can excite the lower fluorescent material layer 12. The thickness through which the light can reach is presumed to be about 30 µm.

The visible light radiated from the lower fluorescent material layer 12 passes through the upper fluorescent material layer 11 and is radiated outside the panel. Therefore, when the upper fluorescent material layer 11 is too thick, it becomes difficult not only for the ultraviolet ray to reach the lower layer but also for the visible light to be taken out. Accordingly, the thickness of the upper fluorescent material layer 11 is preferably at most 15 µm, more preferably about 5 to 10 µm. This is also attributed to the fact that the average particle size of the fluorescent material is about 2 to 3 µm. Also, the lower fluorescent material layer 12 functions as a reflective film of the visible light radiated from the upper fluorescent material layer 11. Namely, it reflects the visible light radiated from the upper fluorescent material layer 11 toward the panel rear in the direction of the front face. The reflective ratio becomes higher as the layer is thicker, and it is saturated at about 30 to 40 µm. However, if the fluorescent material is too thick, material cost becomes high. Practically, the thickness of the lower fluorescent material layer 12 is preferably 10 to 20 µm. That is, a PDP having high light luminous efficiency can be obtained by forming a thin upper fluorescent material layer 11 and the thick lower fluorescent material layer 12

Examples of the fluorescent materials that can be used for the lower fluorescent material layer 12 are shown below.
Green: $Y_2SiO_5:Ce^{3+}, Tb^{3+}$
Blue: $BaMg_2Al_{16}O_{27}:Eu^{2+}, Mn^{2+}$
Red: $3.5MgO.0.5MgF_2.GeO_2:Mn^{4+}$ Embodiment 6

In Embodiment 6 of the present invention, the light luminous efficiency is improved by adding Gd to the material other than the protective film. Specifically, by using a material obtained by adding 7% by mole of gadolinium oxide to lead oxide glass as a rib material, a rib was formed under the same conditions as those of ordinary method. By exciting the formed rib material with vacuum ultraviolet ray including a wavelength of 147 nm, long wavelength ultraviolet ray emission of 315 nm was confirmed in the same manner as in case of using the MgO film. By using the rib material, an alternating current discharge display unit was prepared and white color emission was carried out in the same manner as in Embodiment 3. In comparison with the rib material containing no gadolinium oxide, increase of a color temperature by about 500 degrees was confirmed on an average value. This was due to the fact that there was a portion where the fluorescent material was thin on the upper part of the rib, vacuum ultraviolet ray passed through the thin fluorescent material layer to excite the Gd contained in the rib material. The long wave ultraviolet ray of 315 nm was radiated, and sensitivity of only the blue color fluorescent material was increased in the same as in Embodiment 3. As a result, the color temperature of the white color was improved.

According to the first to fourth materials for converting ultraviolet ray of the present invention, since a small amount of Gd is contained in the base substrate, ultraviolet ray of 315 nm can be generated by irradiation of electromagnetic wave. Therefore, in case of using the material for a display unit, luminous efficiency of the blue fluorescent material alone can be improved, and there is an effect that the color temperature of white color is increased in the display unit.

According to the first to fourth materials for converting ultraviolet ray of the present invention, since the material is positioned around the discharge cell and the ultraviolet ray which is not conventionally used and lost can be absorbed and excite the fluorescent material to generate visible light, there is an effect that luminous efficiency is improved.

According to the fifth to nineteenth display unit of the present invention, the ultraviolet ray which is not conventionally used and lost can be absorbed in Gd contained in the dielectric, the protective film of the dielectric and the partition wall which constitute materials other than the fluorescent material around the discharge cell to generate ultraviolet ray of 315 nm, and this ultraviolet ray excites a fluorescent material having sensitivity around 315 nm to generate visible light. As a result, there is an effect that luminous efficiency of the display unit is improved. In addition, it is possible to improve luminous efficiency of the blue fluorescent material alone, and there is an effect that the color temperature of white color is increased in a display unit.

According to the fourteenth display unit of the present invention, since it has a two-layered structure comprising an upper fluorescent material layer in which the fluorescent material layer absorbs the short wavelength ultraviolet ray and a lower fluorescent material layer in which the fluorescent material layer absorbs the long wavelength ultraviolet ray, there is an effect that the long wavelength ultraviolet ray having a wavelength of 315 nm generated by excitation of Gd is effectively utilized.

As the above-mentioned PDP fluorescent material has an excitation spectrum as shown in FIG. 4, the material has no special improvement in the luminous efficiency in the fluorescent material of red and green fluorescent materials. However, as disclosed on pages 225 and 333 in "Fluorescent Material Handbook" by Fluorescent Material Academy (published by OHM Co.), it is needless to say that light luminous efficiency of the fluorescent materials other than the blue color is improved when a fluorescent material having sensitivity around 315 nm wavelength is used.

What is claimed is:
1. A display device comprising
  a first substrate comprising a dielectric and a protective film for protecting the dielectric;
  a second substrate comprising a partition wall and a fluorescent material layer opposing to the first substrate;
  a rare gas filling space formed between the first substrate and the second substrate; and
  an exciting means for exciting the fluorescent material layer by discharge of the dilute gas and for controlling lighting of a plurality of pixels, wherein at least one member of the group consisting of the dielectric, the protective film and the partition wall comprises gadolinium.

2. The display device according to claim 1, wherein the protective film comprises MgO and gadolinium.

3. The display device according to claim 1, wherein the fluorescent material layer comprises a plurality of the fluorescent material layers, which are parted by the partition wall and emit red, green and blue light.

4. The display device according to claim 1, wherein a first ultraviolet ray is released by discharge of the rare gas to excite the gadolinium by the first ultraviolet ray, and a second ultraviolet ray having longer wavelength than that of the first ultraviolet ray is generated.

5. The display device according to claim 4, wherein a white color temperature is controlled due to an increase of luminous intensity of the blue light emitting fluorescent material layer by the second ultraviolet ray.

6. The display device according to claim 1, wherein an amount of the gadolinium is at least 0.1 to at most 20% by mole.

7. The display device according to claim 4, wherein a wavelength of the first ultraviolet ray is at most 200 nm.

8. The display device according to claim 4, wherein the fluorescent material layer comprises two-layer structure of a first fluorescent material layer and a second fluorescent material layer, wherein a white color temperature is controlled by setting intensities of the first and second ultraviolet ray to the pre-determined values and adjusting luminous intensities of the first and second fluorescent material layers.

9. The display device according to claim 8, wherein the first fluorescent material layer is formed on the second fluorescent material layer.

10. The display device according to claim 8, wherein the first fluorescent material layer is thinner than the second fluorescent material layer.

11. The display device according to claim 2, wherein an amount of the gadolinium is at least 0.1 to at most 20% by mole.

12. A display device comprising a first substrate comprising a dielectric and a protective film for protecting the dielectric;

a second substrate comprising a partition wall and a fluorescent material layer opposing to the first substrate;

a rare gas filling space formed between the first substrate and the second substrate;

an exciting means for exciting the fluorescent material layer by discharge of the dilute gas and for controlling lightening of a plurality of pixels; and a means for converting ultraviolet ray around the fluorescent material layer, wherein the material for converting ultraviolet ray comprises gadolinium in a base substrate, and generates, by ultraviolet ray irradiation, ultraviolet ray having a longer wavelength than the irradiated ultraviolet ray.

* * * * *